United States Patent [19]

Kono et al.

[11] Patent Number: 4,740,064
[45] Date of Patent: Apr. 26, 1988

[54] ZOOM LENS APPARATUS

[75] Inventors: Keizo Kono, Tokyo; Tameaki Ebihara, Yamato; Syohei Kawai, Sagamihara; Yasukazu Tanabe, Inagi; Hiroshi Yoshinari, Yamato, all of Japan

[73] Assignee: Victor Company of Japan, Ltd., Japan

[21] Appl. No.: 854,050

[22] Filed: Apr. 21, 1986

[30] Foreign Application Priority Data

Apr. 23, 1985 [JP] Japan .................. 60-86993

[51] Int. Cl.$^4$ ...................... G02B 7/11; G02B 15/14
[52] U.S. Cl. ................................. 350/429
[58] Field of Search ............... 350/429, 430; 354/72, 354/439, 408, 409; 358/225, 227

[56] References Cited

U.S. PATENT DOCUMENTS 4,054,372 10/1977 Schröeder ........................ 350/429
4,161,756  7/1979 Thomas ............................ 350/429

Primary Examiner—John K. Corbin
Assistant Examiner—Loha Ben
Attorney, Agent, or Firm—Andrus, Sceales, Starke & Sawall

[57] ABSTRACT

A zoom lens apparatus comprises sensors for detecting relative positions of a variable power lens group and a compensating lens group, a memory for pre-storing compensating data peculiar to the zoom lens apparatus, a control circuit and driving parts for moving the variable power lens group and the compensating lens group. The control circuit compares position data set by a variable power setting operation and position data obtained from the sensors and outputs signals for controlling the relative positions of the variable power lens group and the compensating lens group based on the compensating data read out from the memory. The driving parts vary the relative positions of the variable power lens group and the compensating lens group responsive to the output signals of the control circuit.

7 Claims, 4 Drawing Sheets

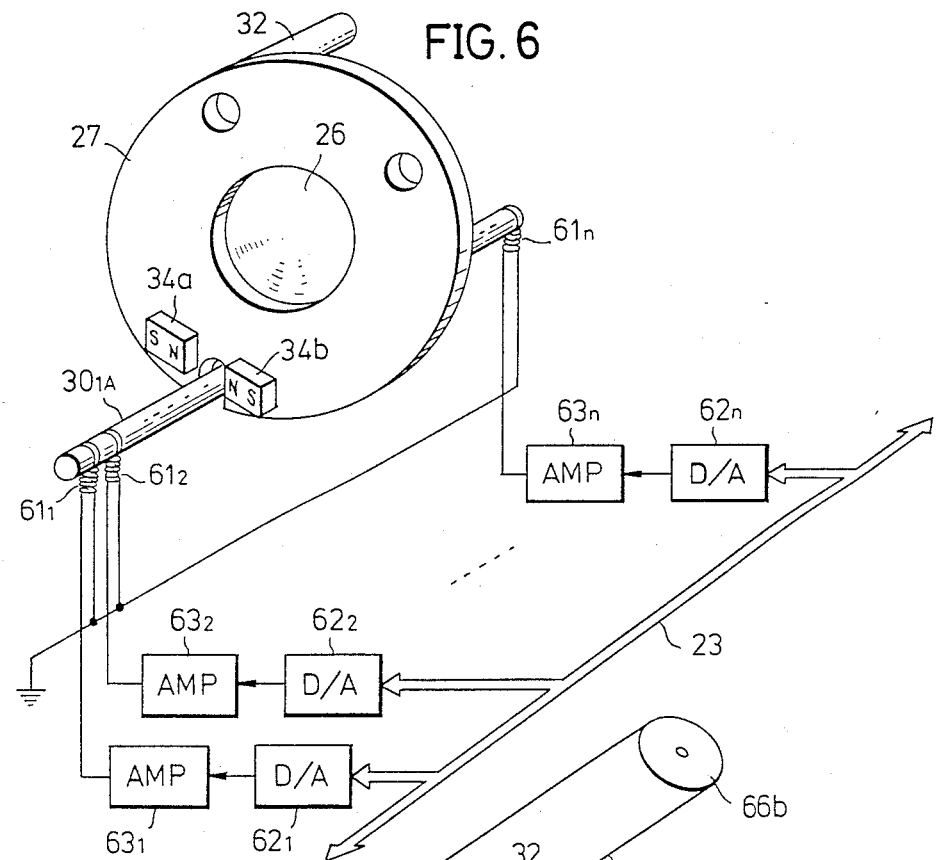
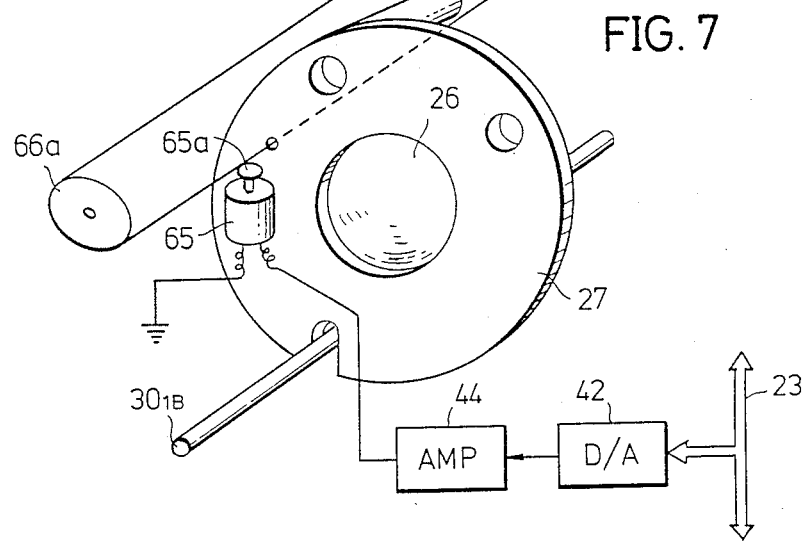

ZOOM LENS APPARATUS

BACKGROUND OF THE INVENTION

The present invention generally relates to zoom lens apparatuses, and more particularly to a zoom lens apparatus having a stable zooming performance.

A lens system of a televison camera is generally constituted by a focus lens group, a variable power lens group, a compensating lens group and a master lens group which are respectively arranged on an optical axis. The variable power lens group and the compensating lens group constitute a zoom lens system. Generally, in a telephoto mode, the variable power lens group and the compensating lens group are adjusted so that the two lens groups are positioned close to each other compared to the respective positions in a standard mode. On the other hand, in a wide angle mode, the variable power lens group and the compensating lens group are adjusted so that the two lens groups are positioned apart from each other compared to the respective positions in the standard mode.

As will be described later on in the specification in conjunction with drawings, a conventional zoom lens apparatus comprises a first frame for supporting the variable power lens group, a second frame for supporting the compensating lens group, guide rails for guiding the first and second frames, and a hollow cylindrical member for accommodating the first and second frames and the guide rails. The first and second frames have first and second projections, respectively, and first and second cam grooves for receiving the first and second projections are formed on a peripheral surface of the hollow cylindrical member. As the hollow cylindrical member is rotated, the first and second projections move along the corresponding first and second cam grooves. The first and second cam grooves are shaped so that the first and second frames close upon each other or separate from each other under the guidance of the guide rails when the hollow cylindrical member is rotated.

However, the conventional zoom lens apparatus has a problem in that the zooming performance of the the zoom lens apparatus (that is, the product) is inconsistent among the zoom lens apparatuses due to deviations in the dimensions of the hollow cylindrical member, the first and second projections, the first and second cam grooves, the thickness of the lenses and the like. In other words, when forming the parts which constitute the zoom lens apparatus, slight deviations or errors in the dimensions of the parts are inevitably introduced. For this reason, it is impossible to manufacture zoom lens apparatuses (products) having a stable zooming performance.

SUMMARY OF THE INVENTION

Accordingly, it is a general object of the present invention to provide a novel and useful zoom lens apparatus in which the problems described heretofore are eliminated.

Another and more specific object of the present invention is to provide a zoom lens apparatus comprising position detecting means for detecting relative positions of a variable power lens group and a compensating lens group, memory means for pre-storing compensating data peculiar to the zoom lens apparatus, comparing means for comparing position data set by a variable power setting operation and position data from the position detecting means and for outputting signals for controlling the relative positions of the variable power lens group and the compensating lens group based on the compensating data read out from the memory means, and driving means responsive to the output signals of the comparing means for varying the relative positions of the variable power lens group and the compensating lens group. According to the zoom lens apparatus of the present invention, it is possible to obtain an ideal and stable zooming performance among the zoom lens apparatuses regardless of deviations or errors in the dimensions of parts which constitute the zoom lens apparatus.

Still another object of the present invention is to provide a zoom lens apparatus wherein the compensating data pre-stored in the memory means are obtained by actually picking up an image of a predetermined pattern by the zoom lens apparatus and comparing an actually measured value of a required focal distance with an ideal focal distance which was calculated when the lenses were designed. The compensating data which are obtained contain such data that the relative positions of the variable power lens group and the compensating lens group are compensated so that the error between the actually measured focal distance and the ideal focal distance becomes zero. According to the zoom lens apparatus of the present invention, the relative positions of the variable power lens group and the compensating lens group are accurately compensated depending on the characteristic of each lens used in the zoom lens apparatus. As a result, it is possible to obtain an extremely stable zooming performance.

Other objects and further features of the present invention will be apparent from the following detailed description when read in conjunction with the accompanying drawings.

BRIEF DESCRIPTION OF THE DRAWINGS

FIG. 6 shows a modification of a driving part in the block system shown in FIG. 3;

FIG. 7 shows another embodiment of the driving part in the block system shown in FIG. 3;

DETAILED DESCRIPTION

Figure 1:
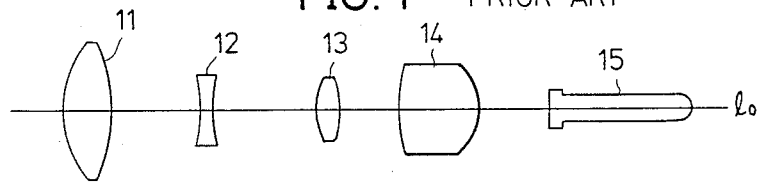
FIG. 1 shows an example of a lens system of a general television camera.

As shown in FIG. 1, an example of a lens system of a general television camera generally comprises a focus lens group 11, a variable power lens group 12, a compensating lens group 13 and a master lens group 14 which are respectively arranged on an optical axis $l_o$. The variable power lens group 12 and the compensating lens group 13 constitute a zoom lens system. Generally, in a telephoto mode, the variable power lens group 12 and the compensating lens group 13 are adjusted so that the two lens groups are positioned close to each other compared to the respective positions in a standard mode. On the other hand, in a wide angle mode, the variable power lens group 12 and the compensating lens group 13 are adjusted so that the two lens groups are positioned apart from each other compared to the respective positions in the standard mode.

Figure 2:
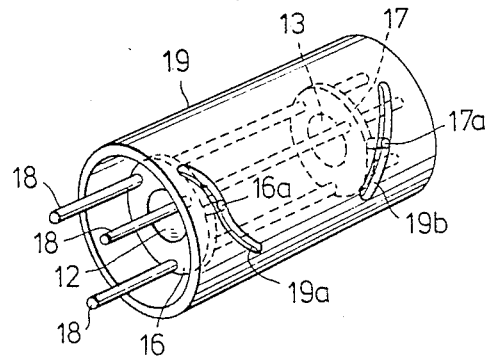
FIG. 2 is a perspective view showing an example of a conventional zoom lens apparatus.

An example of a conventional zoom lens apparatus is shown in FIG. 2. The conventional zoom lens apparatus comprises a first frame 16 for supporting the variable power lens group 12, a second frame 17 for supporting the compensating lens group 13, guide rails 18 for guiding the first and second frames 16 and 17, and a hollow cylindrical member 19 for accommodating the first and second frames 16 and 17 and the guide rails 18. The first and second frames 16 and 17 have first and second projections 16a and 17a, respectively, and first and second cam grooves 19a and 19b for receiving the first and second projections 16a and 17a are formed on a peripheral surface of the hollow cylindrical member 19. As the hollow cylindrical member 19 is rotated, the first and second projections 16a and 17a move along the corresponding first and second cam grooves 19a and 19b. The first and second cam grooves 19a and 19b are shaped so that the first and second frames 16 and 17 close upon each other or separate from each other under the guidance of the guide rails 18 when the hollow cylindrical member 19 is rotated.

However, the conventional zoom lens apparatus has a problem in that the zooming performance of the the zoom lens apparatus (that is, the product) is inconsistent among the zoom lens apparatuses due to deviations in the dimensions of the hollow cylindrical member 19, the first and second projections 16a and 17a, the first and second cam grooves 19a and 19b, the thicknesses of the lenses and the like. In other words, when forming the parts which constitute the zoom lens apparatus, slight deviatioons or errors in the dimensions of the parts are inevitably introduced. For this reason, it is impossible to manufacture zoom lens apparatuses (products) having a stable zooming performance.

The present invention eliminates the problems of the conventional zoom lens apparatus which employs an entirely mechanical position control by employing an electrical position control as will be described hereinafter.

Figure 3:
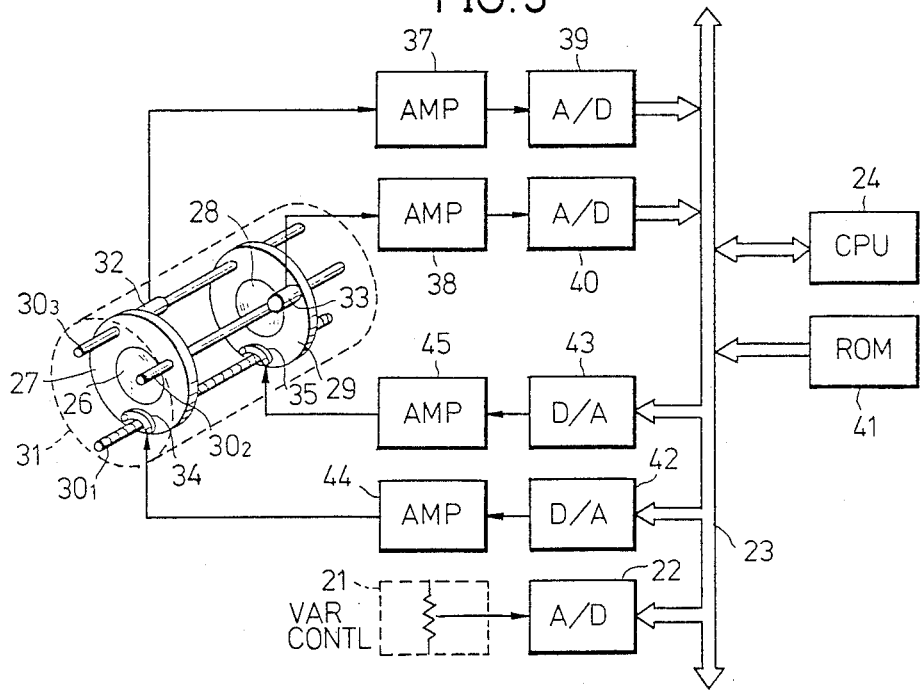
FIG. 3 is a system block diagram showing an embodiment of the zoom lens apparatus according to the present invention.

FIG. 3 shows an embodiment of the zoom lens apparatus according to the present invention. When a variable power control part 21 is manipulated and the zoom lens apparatus is set to a predetermined mode (for example, a telephoto mode) by setting the magnification to a predetermined value, a voltage corresponding to the predetermined mode is supplied to an analog-to-digital (A/D) converter 22 from the variable power control part 21. The A/D converter 22 converts the voltage from the variable power control part 21 into a digital signal and supplies the digital signal to a central processing unit (CPU) 24 via a data bus 23.

A zoom lens part comprises a frame 27 for supporting a variable power lens group 26, a frame 29 for supporting a compensating lens group 28, guide rails $30_1$ through $30_3$ for guiding the frames 27 and 29, and a hollow cylindrical member 31 for accommodating the frames 27 and 29 and the guide rails $30_1$ through $30_3$. Indexes for indicating the position of each frame are provided on the guide rails $30_2$ and $30_3$. The frame 27 has a position sensor 32 for detecting the position of the frame 27 by reading the index provided on the guide rail $30_3$, and a driving part 34 for driving the frame 27. Similarly, the frame 29 has a position sensor 33 for detecting the position of the frame 29 by reading the index provided on the guide rail $30_2$, and a driving part 35 for driving the frame 29. Output position detection signals of the position sensors 32 and 33 are supplied to respective amplifiers 37 and 38. Output signals of the amplifiers 37 and 38 are subjected to analog-to-digital conversion in respective A/D converters 39 and 40. First and second digital position data obtained from the A/D converters 39 and 40 are supplied to the CPU 24 via the data bus 23.

Figure 4:
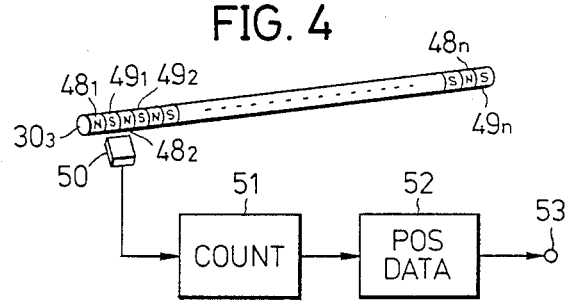
FIG. 4 is a diagram for explaining an embodiment of a position sensor in the block system shown in FIG. 3.

FIG. 4 shows an embodiment of the position sensor. Since the positioon sensors 32 and 33 have the same construction, description will only be given with respect to the construction of the position sensor 32. In FIG. 4, magnets $48_1$ through $48_n$ and magnets $49_1$ through $49_n$ of mutually opposite magnetic poles are alternately provided on the guide rail $30_3$ for a movable range of the position sensor 32. The position sensor 32 comprises a Hall element 50 fixed to the frame 27, a counter 51 and a position detection signal generating circuit 52. While the frame 27 moves and the Hall element 50 accordingly moves, the Hall element 50 outputs a pulse every time the Hall element 50 passes a magnet on the guide rail $30_3$ having one kind of magnetic pole, that is, the north magnetic pole, for example. The counter 51 counts the output pulses of the Hall element 50, and a counted value in the counter 51 is supplied to the position detection signal generating circuit 52. The position detection signal generating circuit 52 generates a position detection signal indicating the position of the frame 27 based on the counted value from the counter 51, and this position detection signal is supplied to the amplifier 37 shown in FIG. 3 via an output terminal 53.

Returning now to the description of the block system shown in FIG. 3, a read only memory (ROM) 41 prestores compensating data peculiar to the particular zoom lens apparatus, as will be described later. Even when the setting made by the variable power control part 21 is the same, the relative positions of the variable power lens group and the compensating lens group slightly differs for each zoom lens apparatus due to the deviations or errors in the dimensions of the parts which constitute the zoom lens apparatus. Accordingly, the compensating data are used to compensate the relative positions of the variable power lens group and the compensating lens group in order to obtain an optimum zooming performance with the zoom lens apparatus. The compensating data comprises compensating position data for both the variable power lens group and the compensating lens group.

Figure 5:
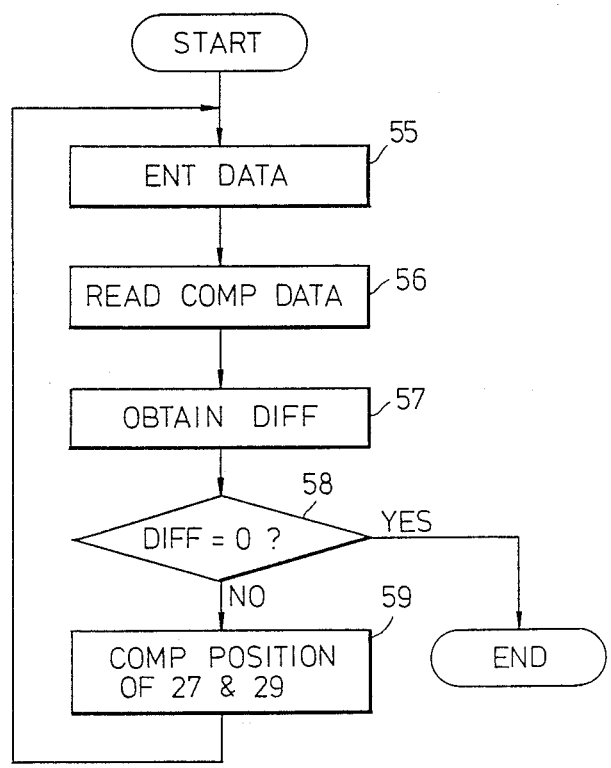
FIG. 5 is a flow chart for explaining the operation of a central processing unit in the block system shown in FIG. 3.

Next, description will be given with respect to the operation of the CPU 24 by referring to the flow chart shown in FIG. 5. When the predetermined mode is set by manipulating the variable power control part 21 and a magnification datum is supplied to the A/D converter 22, the operation of the CPU 24 is started and a step 55 enters a digital magnification datum from the A/D converter 22 and first and second digital position data from the A/D converters 39 and 40. A step 56 reads out from the ROM 41 first and second compensating position data for the variable power lens group 26 and the compensating lens group 28 based on the digital magnification datum. A step 57 obtains a first difference between the first digital position datum and the first compensating position datum, and a second difference between the second digital position datum and the second compensating position datum. A step 58 discriminates whether or not the first and second differences are zero. When the discrimination result in the step 58 is NO, a step 59 outputs a first digital control signal for compensating the position of the variable power lens group 26 (that is, the frame 27) depending on the first difference, and also outputs a second digital control signal for compensating the position of the variable power lens group 28 (that is, the frame 29) depending on the second difference. After the step 59, the operation returns to the step 55. On the other hand, when the discrimination result in the step 58 is YES, the operation is ended.

The first and second digital control signals outputted from the CPU 24 are supplied to respective digital-to-analog (D/A) converters 42 and 43 shown in FIG. 3 wherein the digital control signals are converted into predetermined analog voltages. The output voltages of the D/A converters 42 and 43 are respectively passed through amplifiers 44 and 45 and are supplied to the corresponding driving parts 34 and 35. As a result, the frames 27 and 29 are driven by the respective driving parts 34 and 35 depending on the first and second digital control signals, and the relative positions of the variable power lens group 26 and the compensating lens group 28 are controlled to optimum relative positions for the setting made by the variable power control part 21. Hence, the frames 27 and 29 are moved depending on the setting made by the variable power control part 21, and the predetermined magnification is accurately obtained. Therefore, the zooming performance of the zoom lens apparatus is always stable regardless of the deviations or errors in the dimensions of the parts which constitute the zoom lens apparatus. In the present embodiment, the driving parts 34 and 35 respectively comprises a moving coil, and the guide rail $30_1$ comprises a plurality of magnets as in the case of the guide rail $30_3$ shown in FIG. 4. thus, when the output voltages of the D/A converters 42 and 43 are supplied to the corresponding moving coils via the respective amplifiers 44 and 45, the moving coils act on the magnets of the guide rail $30_1$ and the frames 27 and 29 are moved according to the principle of a linear motor.

FIG. 6 shows a modification of the driving part. Since the driving parts 34 and 35 have the same construction, description will only be given with respect to the construction of the driving part 34. In FIG. 6, those parts which are the same as those corresponding parts in FIG. 3 are designated by the same reference numerals, and description thereof will be omitted. In the present modification, the driving part 34 comprises a pair of magnets 34a and 34b, and a plurality of coils $61_1$ through $61_n$ are provided on a guide rail $30_{1A}$. In addition, D/A converters $62_1$ through $62_n$ and amplifiers $63_1$ through $63_n$ are provided in correspondence with the coils $61_1$ through $61_n$ instead of the D/A converters 42 and 43 and the amplifiers 44 and 45. Hence, the coils $61_1$ through $61_n$ are controlled by outputs of the amplifiers $63_1$ through $63_n$ depending on the data obtained via the data bus 23. Because the principle of the linear motor is known, description on the operation of the linear motor will be omitted.

FIG. 7 shows another embodiment of the driving part. Again, description will only be given with respect to the construction of the driving part 34. In FIG. 7, those parts which are the same as those corresponding parts in FIG. 3 are designated by the same reference numerals, and description thereof will be omitted. In the present embodiment, the driving part 34 comprises a stepping motor 65 fixed to the frame 27, and a guide rail $30_{1B}$ is not provided with magnets nor coils. A wire 67 provided between pulleys 66a and 66b penetrates the frame 27, and a rotary shaft 65a of the stepping motor 65 makes contact with the wire 67. Accordingly, when the stepping motor 65 is driven by the output of the amplifier 44, the rotary shaft 65a rolls along the wire 67 and moves the frame 27. It is not essential to fix the stepping motor 65 on the frame 27. For example, it is possible to fix the frame 27 on a going or returning part of the wire 67 and drive the wire 67 by the stepping motor 65 so as to move the frame 27.

Figure 8:
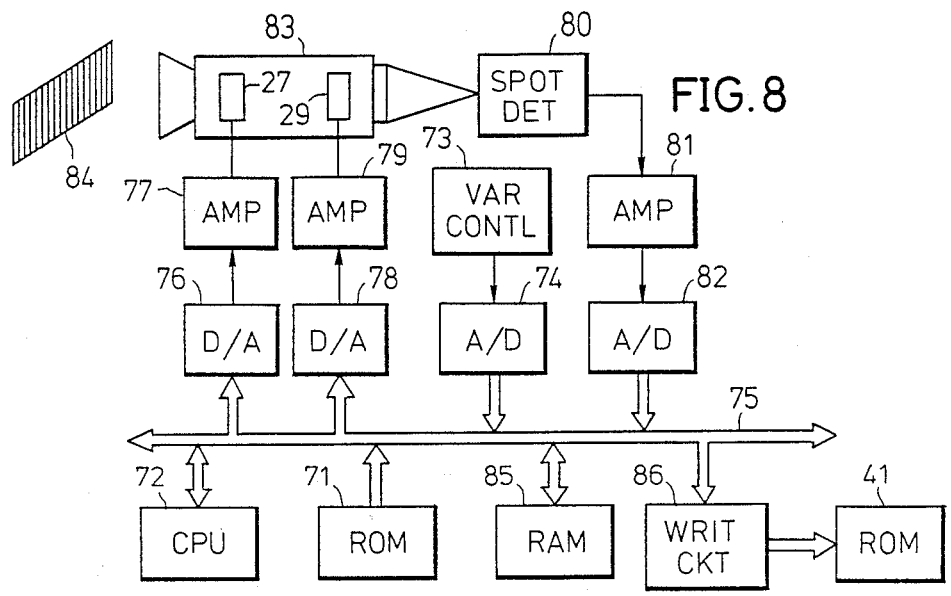
FIG. 8 is a system block diagram showing an embodiment of an apparatus for obtaining compensating data which are to be pre-stored in a read only memory in the block system shown in FIG. 3.
Figure 9:
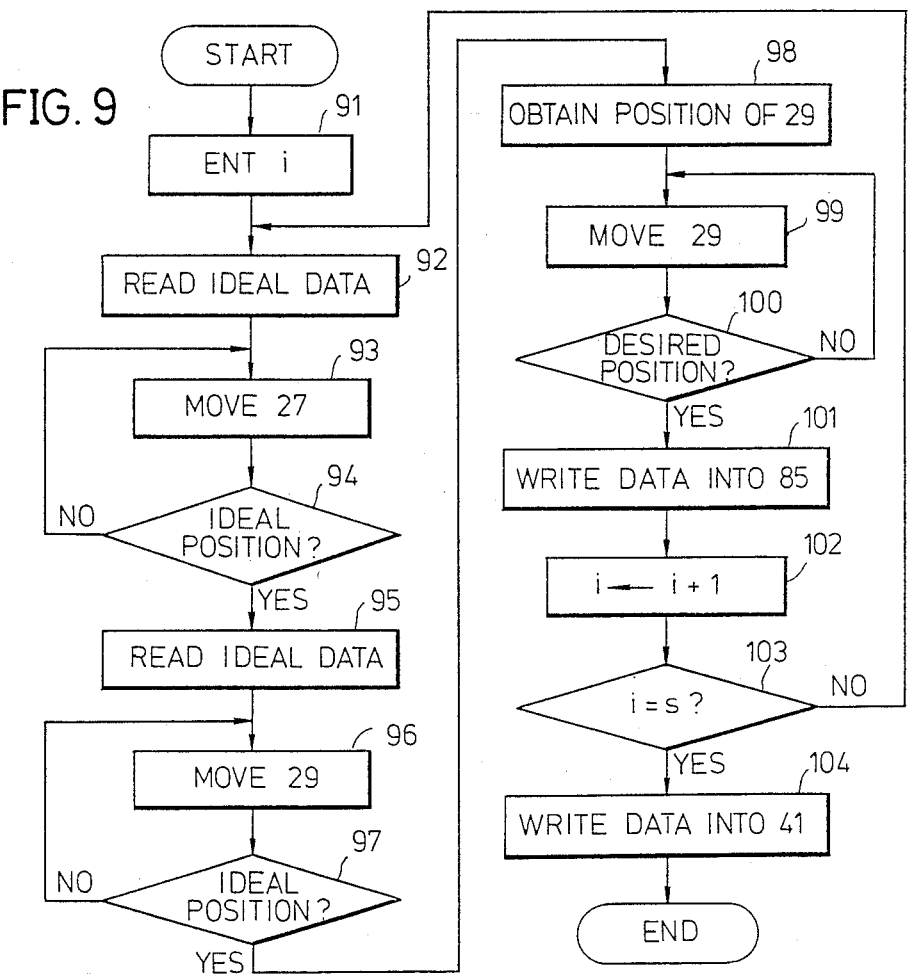
FIG. 9 is a flow chart for explaining the operation of a central processing unit in the block system shown in FIG. 8.

Next, description will be given with respect to an embodiment of an apparatus for obtaining the compensating data which are to be pre-stored in the ROM 41 shown in FIG. 3, by referring to FIGS. 8 and 9. In FIG. 8, a ROM 71 pre-stores ideal data which were calculated when designing the lenses. The ideal data comprise first and second ideal position data of the frames 27 and 29 for each of various magnification data. When the operation of a CPU 72 is started, a step 91 shown in FIG. 9 enters a magnification datum i set by a variable power control part 73 into the CPU 72 via an A/D converter 74 and a data bus 75. A step 92 reads out from the ROM 71 a first ideal position datum for the magnification datum i, based on the magnification datum i. A step 93 outputs a control signal for driving the frame 27 based on the first ideal position datum and supplies this control signal to the driving part of the frame 27 via the data bus 75, a D/A converter 76 and an amplifier 77 so as to move the frame 27. A step 94 discriminates whether or not the frame 27 has reached a position designated by the first ideal position datum. The operation returns to the step 93 when the discrimination result in the step 94 is NO.

On the other hand, when the discrimination result in the step 94 is YES, a step 95 reads out from the ROM 71 the second ideal position datum for the magnification datum i. A step 96 outputs a control signal for driving the frame 29 based on the second ideal position datum and supplies this control signal to the driving part of the frame 29 via the data bus 75, a D/A converter 78 and an amplifier 79 so as to move the frame 29. A step 97 discriminates whether or not the frame 29 has reached a position designated by the second ideal position datum. The operation returns to the step 96 when the discrimination result in the step 97 is NO.

When the discrimination result in the step 97 is YES, a step 98 outputs a control signal for moving the frame 29 back and forth by small distances and supplies this control signal to the driving part of the frame 29 via the data bus 75, the D/A converter 78 and the amplifier 79 so as to move the frame 29 back and forth. While the frame 29 is moved back and forth by small distances, the CPU 72 enters an output of a spot detector 80 via an amplifier 81, an A/D converter 82 and the data bus 75, and obtains a position of the frame 29 where the output of the spot detector 80 becmes a maximum value. The spot detector 80 is arranged at an image formation position of an image which is obtained by picking up a pattern 84 having a predetermined frequency by a zoom lens apparatus 83. The spot detector 80 reads a signal of the pattern 84 by use of image pickup elements or the like. Accordingly, the position of the frame 29 where the signal of the pattern 84 read by the spot detector 80 becomes the maximum value (maximum amplitude) is the position where an optimum focal point is obtained.

A step 99 outputs a control signal for moving the frame 29 to the position where the optimum focal point is obtained, and supplies this control signal to the driving part of the frame 29 via the data bus 75, the D/A converter 78 and the amplifier 79. A step 100 discriminates whether or not the frame 29 has reached the desired position where the optimum focal point is obtained. When the discrimination result in the step 100 is NO, the operation returns to the step 99. On the other hand, when the discrimination result in the step 100 is YES, a step 101 writes into a random access memory (RAM) 85 a first compensating position datum for the frame 27 (that is, for the variable power lens group) and a second compensating position datum for the frame 29 (that is, for the compensating lens group). A step 102 increments the magnification datum i by one level (or step), and a step 103 discriminates whether or not the magnification datum i has reached a predetermined magnification level S. When the discrimination result in the step 103 is NO, the operation returns to the step 92. On the other hand, when the discrimination result in the step 103 is YES, a step 104 writes into the ROM 41 the first and second compensating position data which are stored in the RAM 85, via the data bus 75 and a write circuit 86.

The ROM 41 which is written with the compensating data which are duplicated from the compensating data stored in the RAM 85 is loaded into the zoom lens apparatus 83. Accordingly, it is possible to write into each ROM 41 the compensating data peculiar to each zoom lens apparatus and load the ROM 41 into the zoom lens apparatus.

Further, the present invention is not limited to these embodiments, but various variations and modifications may be made without departing from the scope of the present invention.

What is claimed is:

1. A zoom lens apparatus comprising:
a variable power lens group;
first driving means for moving said variable power lens group;
a compensation lens group provided on an optical axis identical to that of said variable power lens group;
second driving means for moving said compensating lens group;
guide means for guiding said variable power lens group and said compensation lens group so that said variable power lens group and said compensation lens group move on said optical axis;
variable power setting means for setting a desired magnification out of various magnifications;
first memory means for pre-storing compensating data peculiar to the zoom lens apparatus for each of the various magnifications;
position detecting means for detecting positions of said variable power lens group and said compensation lens group and for outputting position data thereof; and
first control means coupled to said variable power setting means, said first memory means and said position detecting means for reading out compensating data from said first memory means based on the desired magnification set by said variable power setting means, and for respectively supplying to said first and second driving means control signals for moving said variable power lens group and said compensating lens group so that compensating data read out from said first memory means respectively coincide with the output position data of said position detecting means,
said compensating data being obtained by a compensating data obtaining apparatus which comprises second memory means for pre-storing predetermined positional data independent of the zoom lens apparatus for each of the various magnifications, optimum focal point detecting means for detecting whether said variable power lens group and said compensating lens group assume respective positions where an optimum focal point is obtained, and second control means coupled to said second memory means and said optimum focal point detecting means,
said second control means controlling said first and second driving means so as to move said variable power lens group and said compensating lens group to predetermined positions respectively dependent on said predetermined positional data for each of the various magnifications and thereafter displace at least one of said variable power lens group and said compensating lens group until said optimum focal point detecting means detects that said variable power lens group and said compensating lens group assume the respective positions where the optimum focal point is obtained, and obtaining, as said compensating data, positional data related to the respective positions of said variable power lens group and said compensating lens group when the optimum focal point is obtained.

2. A zoom lens apparatus as claimed in claim 1 in which said optimum focal point detecting means detects that said variable power lens group and said compensating lens group assume the respective position where the optimum focal point is obtained when an image of a predetermined pattern is actually picked up by the zoom lens apparatus.

3. A zoom lens apparatus as claimed in claim 1 in which said first and second driving means respectively comprise a stepping motor.

4. A zoom lens apparatus comprising:
a variable power lens group;
first driving means for moving said variable power lens group;
a compensation lens group provided on an optical axis identical to that of said variable power lens group;
second driving means for moving said compensating lens group;
guide means for guiding said variable power lens group and said compensation lens group so that said variable power lens group and said compensation lens group move on said optical axis;
variable power setting means for setting a desired magnification out of various magnifications;
memory means for pre-storing compensating data peculiar to the zoom lens apparatus for each of the various magnifications;
position detecting means for detecting positions of said variable power lens group and said compensation lens group and for outputting position data thereof; and control means coupled to said variable power setting means, said memory means and said position detecting means for reading out compensating data from said memory means based on the desired magnification set by said variable power setting means, and for respectively supplying to said first and second driving means control signals for moving said variable power lens group and said compensating lens group so that compensating data read out from said memory means respectively coincide with the output position data of said position detecting means, said guide means comprising a guide rail provided with indexes indicative of positions, said positions detecting means comprising sensors for detecting the positions of said variable power lens group and said compensating lens group by reading the indexes of the guide rail.

5. A zoom lens apparatus as claimed in claim 4 in which said guide rail is provided with a plurality of magnets having such an arrangement that magnets of opposite magnetic poles are alternately arranged, each of said sensors outputting a pulse every time the sensor passes a magnet of one kind of magnetic pole, said position detecting means further comprising counter means for counting output pulses of each sensor and position data generating means for generating position data depending on a count in said counter means.

6. A zoom lens apparatus comprising:
a variable power lens group;
first driving means for moving said variable power lens group;
a compensation lens group provided on an optical axis identical to that of said variable power lens group;
second driving means for moving said compensating lens group;
guide means for guiding said variable power lens group and said compensation lens group so that said variable power lens group and said compensation lens group move on said optical axis;
variable power setting means for setting a desired magnification out of various magnifications;
memory means for pre-storing compensating data peculiar to the zoom lens apparatus for each of the various magnifications;
position detecting means for detecting positions of said variable power lens group and said compensation lens group and for outputting position data thereof; and
control means coupled to said variable power setting means, said memory means and said position detecting means for reading out compensating data from said memory means based on the desired magnification set by said variable power setting means, and for respectively supplying to said first and second driving means control signals for moving said variable power lens group and said compensating lens group so that compensating data read out from said memory means respectively coincide with the output position data of said position detecting means, said guide means comprising a guide rail which is provided with a plurality of magnets having such an arrangement that magnets of opposite magnetic poles are alternately arranged, said first and second driving means respectively comprising a moving coil which constitutes a linear motor together with said guide rail.

7. A zoom lens apparatus comprising:
a variable power lens group;
first driving means for moving said variable power lens group;
a compensation lens group provided on an optical axis identical to that of said variable power lens group;
second driving means for moving said compensating lens group;
guide means for guiding said variable power lens group and said compensation lens group so that said variable power lens group and said compensation lens group move on said optical axis;
variable power setting means for setting a desired magnification out of various magnifications;
memory means for pre-storing compensating data peculiar to the zoom lens apparatus for each of the various magnifications;
position detecting means for detecting positions of said variable power lens group and said compensation lens group and for outputting position data thereof; and
control means coupled to said variable power setting means, said memory means and said position detecting means for reading out compensating data from said memory means based on the desired magnification set by said variable power setting means, and for respectively supplying to said first and second driving means control signals for moving said variable power lens group and said compensating lens group so that compensating data read out from said memory means respectively coincide with the output position data of said position detecting means, said guide means comprising a guide rail provided with a plurality of coils, said first and second driving means respectively comprising magnets which constitute a linear motor together with said guide rail.

* * * * *